(12) United States Patent
Kallfass et al.

(10) Patent No.: US 12,007,464 B2
(45) Date of Patent: Jun. 11, 2024

(54) METHOD FOR ASCERTAINING AT LEAST ONE PHYSICAL PARAMETER OF A SYSTEM BY EXPLOITING THE REFLECTION FROM A REFERENCE OBJECT

(71) Applicant: UNIVERSITÄT STUTTGART, Stuttgart (DE)

(72) Inventors: Ingmar Kallfass, Stuttgart (DE); Christopher Grötsch, Stuttgart (DE); Benjamin Schoch, Weil der Stadt (DE)

(73) Assignee: UNIVERSITÄT STUTTGART, Stuttgart (DE)

( * ) Notice: Subject to any disclaimer, the term of this patent is extended or adjusted under 35 U.S.C. 154(b) by 884 days.

(21) Appl. No.: 16/978,326

(22) PCT Filed: Mar. 5, 2019

(86) PCT No.: PCT/EP2019/055405
§ 371 (c)(1),
(2) Date: Sep. 4, 2020

(87) PCT Pub. No.: WO2019/170648
PCT Pub. Date: Sep. 12, 2019

(65) Prior Publication Data
US 2021/0041550 A1    Feb. 11, 2021

(30) Foreign Application Priority Data
Mar. 5, 2018    (DE) .................... 10 2018 001 731.2

(51) Int. Cl.
*G01S 13/34*    (2006.01)
*G01N 22/00*    (2006.01)
(Continued)

(52) U.S. Cl.
CPC .............. *G01S 13/34* (2013.01); *G01N 22/00* (2013.01); *G01N 29/12* (2013.01); *G01S 15/34* (2013.01)

(58) Field of Classification Search
None
See application file for complete search history.

(56) References Cited

U.S. PATENT DOCUMENTS

2015/0268218 A1* 9/2015 Troxler .................... G01N 9/24
342/21

FOREIGN PATENT DOCUMENTS

DE        10044888 A1    4/2002
DE    102006032735 A1    1/2008
(Continued)

OTHER PUBLICATIONS

International Search Report dated Jul. 2, 2019, in PCT Appl. No. PCT/EP2019/055405.
(Continued)

*Primary Examiner* — Whitney Moore
(74) *Attorney, Agent, or Firm* — MEDLER FERRO WOODHOUSE & MILLS PLLC

(57) ABSTRACT

A method for determining at least one physical parameter of a system comprising at least two reflection objects is presented, comprising: producing a transmission signal comprising at least one modulated electromagnetic or acoustic wave; receiving a first reception signal that is based on the transmission signal reflected by a first reflection object; receiving a second reception signal that is based on the transmission signal reflected by a second reflection object; receiving a third or further reception signal(s) that is/are based on the transmission signal reflected by a first or second or further reflection object(s); ascertaining the at least one physical parameter of the system on the basis of the first (Continued)

reception signal and further reception signals; ascertaining unknown distances between reflection objects or material properties, composition or nature of the media between the reflection objects of the system on the basis of the first reception signal and further reception signals.

16 Claims, 2 Drawing Sheets

(51) Int. Cl.
    *G01N 29/12*      (2006.01)
    *G01S 15/34*      (2006.01)

(56) References Cited

FOREIGN PATENT DOCUMENTS

| | | |
|---|---|---|
| EP | 1191315 A2 | 3/2002 |
| WO | 2014/153263 A1 | 9/2014 |

OTHER PUBLICATIONS

Christiane Maierhofer, "Radaranwendungen im Bauwesen", ZFP-ZEITUNG, Bd. 72, I. Dec. 2000.
Examination Report dated Nov. 22, 2018, in file No. 10 2018 001 731.2.
Volker Deutsch, et al."Ultrasonic Testing", Springer-Verlag Berlin Heidelberg 1997, pp. 310-313.
Office Action dated Dec. 6, 2022 in EP Appl. No. 19 709 448.5 (with computer-generated English translation).

\* cited by examiner

METHOD FOR ASCERTAINING AT LEAST ONE PHYSICAL PARAMETER OF A SYSTEM BY EXPLOITING THE REFLECTION FROM A REFERENCE OBJECT

CROSS-REFERENCE TO RELATED APPLICATIONS

This application is a national phase entry under 35 U.S.C. 371 of International Application No. PCT/EP2019/055405, filed Mar. 5, 2019, which claims priority to DE Application No. 10 2018 001 731.2, filed Mar. 5, 2018, the entire contents of which are incorporated by reference herein.

FIELD OF THE INVENTION

The present invention is directed to a method for ascertaining at least one physical parameter of a system by exploiting the reflection from a reference object.

SUMMARY

The subject matter of the present application relates to a method, a device and a system for determining at least one physical parameter of a system, in particular of distances and material properties between reflection objects, utilizing the reflection from a reference object.

Various radar methods are usually used to detect and analyze objects. Radar is the abbreviation for "radio detection and ranging" and describes various detection and locating methods based on electromagnetic waves in the radio frequency range.

Conventional radar methods can be divided into several subgroups:

A frequently used radar method is the continuous-wave radar method, which comprises the continuous transmission of a high-frequency electromagnetic wave in one direction. If this electromagnetic wave hits a reflection object, part of the energy is thrown back as an echo signal and recorded by a receiver. The transmission signal has a constant frequency with a constant amplitude. The received echo signal has either the same frequency or, if the object being reflected is moving, a frequency that differs due to the Doppler effect. The frequency of the reception signal is compared with the transmission signal in a receiving-side mixer stage, and the relative speed of the reflection object to the receiver is determined. It is not possible to measure the distance of the reflection object.

A special subtype of continuous-wave radar is frequency-modulated continuous-wave radar. Here, the operating frequency of the transmission signal changes periodically during the measurement so that, in addition to the speed measurement, a distance measurement can be carried out due to the detection possibility of the time difference between the transmission and reception signals. Here, the resolution and measuring range can be defined by selecting the frequency deviation and the rate of change of the transmission signal.

An alternative radar method is the monostatic radar method, in which transmitter and receiver use the same antenna. An exemplary implementation is the pulse radar, which emits short (in terms of time) and powerful pulses and receives their reflected echo signals. The pulse radar is particularly suitable for distance measuring of reflecting objects. However, the use of an antenna for transmitting and receiving requires a time control of the processes, as well as a long pause between the individual transmission pulses.

In all of these radar methods, the received echo signals are compared with the transmission signal in a receiving-side mixer stage. This leads to a not inconsiderable complexity and to a restricted dynamic range of the receiver.

In contrast to this, passive radar is a locating technology that does not emit any electromagnetic energy itself in order to analyze the reflected echo thereof. Instead, echo signals of non-system radio waves, such as from radio or mobile radio transmission towers, are detected and evaluated. As a result, if the position of the source is known, a moving reflective object can be identified in the radiation field of the transmitter and, for example, its distance and speed can be determined. However, because of the complicated and time-consuming calculations in signal evaluation, this method requires a very high computing power.

The passive radar is a subtype of the bi-static radar method, which consists of a transmitter and a receiver, wherein the transmitter and receiver are spatially separated and their distance is similar to or greater than the distance to the object to be detected.

Another subtype of the bi-static radar method is the "forward scatter radar", in which an object located in the direct line between transmitter and receiver creates a shadow at the receiver.

The radar methods described and suitable for determining distances between reflection objects all have a common time or frequency base between transmitter and receiver, i.e. transmitter and receiver have to work coherently. In addition, they have a high system complexity and a limited dynamic range, especially on the receiver side. However, these are necessary in order to obtain precise and unambiguous measurements of the distances between the transmitter or receiver and the reflection object. However, in many cases the exact distance between transmitter/receiver is not the variable you are looking for, but rather the relative distance between individual reflection objects. The measurement of relative distances of a plurality of reflection objects is possible with significantly less technical effort and higher dynamics than is required for the radar methods mentioned.

It is therefore an object of the present invention to provide a method, a device and a system for determining at least one physical parameter of a system, in particular distances between reflection objects, if there is no coherence or a common time or frequency base between transmitter and receiver, and reduced receiver complexity and increased dynamic range.

This object is solved by the features of the independent claims. Preferred embodiments are subject of the dependent claims.

A first aspect for solving the object relates to a method for determining at least one physical parameter of a system with at least two reflection objects, comprising the steps of:
  generating a transmission signal comprising at least one modulated wave;
  receiving a first reception signal, wherein the first reception signal is based on the transmission signal reflected by a first reflection object;
  receiving a second reception signal, wherein the second reception signal is based on the transmission signal reflected by a second reflection object;
  determining the at least one physical parameter of the system, in particular the distance between the first reflection object and the second reflection object, based on the first reception signal and the second reception signal.

Preferably, the at least one physical parameter of the system is determined without including or using the transmission signal. In other words: The at least one physical parameter is preferably determined by mixing two or more reception signals without using the transmission signal.

Advantageously, according to the method described above, at least one physical parameter of a system, in particular distances between reflection objects, if there is no coherence or a common time or frequency base between transmitter and receiver, as well as reduced receiver complexity and increased dynamic range, is determined.

In the context of this invention, a transmission signal can in particular be understood to mean electromagnetic radiation, e.g. radar rays, especially in the microwave range (3 GHz-30 GHz), millimeter wave frequency range (30 GHz-300 GHz), sub-millimeter wave frequency range (300 GHz-3 THz), infrared, visible light, ultraviolet or X-ray radiation, in particular an electromagnetic wave generated by a signal generator with a characteristic time course, which is or can be emitted with the aid of a transmitting antenna. A particularly preferred frequency range is between about 300 MHz to about 300 GHz.

In the context of this invention, a transmission signal can in particular be understood to mean an acoustic wave, e.g. a longitudinal wave and/or a transverse wave. Here, an acoustic wave can be generated, for example, by a sound transducer on the basis of a piezoelectric crystal. The acoustic wave can be received by a microphone, which causes harmonics or distortion. A preferred frequency range is in the ultrasonic range above 20 kHz, which in particular comprises the frequency range of acoustic microscopy.

In particular, the transmission signal can comprise at least one modulated electromagnetic wave and/or at least one modulated acoustic wave. The use of at least one modulated electromagnetic wave and at least one modulated acoustic wave can in particular increase the scope of the method.

In the following, features will be described in particular with regard to electromagnetic radiation. However, it is to be understood here that all features can be realized with regard to electromagnetic radiation or waves and/or with regard to acoustic waves.

A modulated wave can in particular be generated by a frequency modulation, for example according to a linear, triangular frequency ramp or according to a rising and falling frequency ramp. Another possible form of frequency modulation is a non-linear frequency ramp, for example. In addition to frequency modulation, other types of modulation such as amplitude modulation, phase modulation and/or pulse width modulation are conceivable.

In the context of this invention, a reception signal is understood to mean in particular electromagnetic radiation and/or acoustic waves, which is/are received by means of a receiving antenna. The reception signal includes the transmission signals reflected by one or more reflection objects.

Electromagnetic radiation and/or acoustic waves is/are at least partially reflected at interfaces between propagation media with different wave resistance or refractive index when they are incident thereon, with only part of the energy of the incident radiation being usually thrown back (partial reflection).

If the propagation medium is known, for example air and/or a known mixture of substances, between the first reflection object and the second reflection object, a distance between the first reflection object and the second reflection object can be determined based on the first reception signal and the second reception signal. Here, the distance between the first reflection object and the second reflection object is a physical parameter of the system. In addition, physical parameters of the propagation medium between the first reflection object and the second reflection object can be known, measured and/or estimated. Preferably, the parameters of the propagation medium can be known approximately or on the basis of parameter intervals/ranges. In particular, the propagation medium can be the first reflection object, in which case the first reflection object and the second reflection object are adjacent to one another in particular at least along one propagation direction of the transmission signal.

If the distance between the first reflection object and the second reflection object of the system is known, the presence of a medium between the first reflection object and the second reflection object and/or a physical parameter of the medium can be determined as the at least one physical parameter of the system. Here, the physical parameter of the medium can preferably include at least one dielectric and/or mechanical property of the medium, for example the propagation constant or the permittivity of the medium between the first reflection object and the second reflection object. Here, the known distance can be predetermined, measured and/or estimated. The known distance can preferably be known approximately or on the basis of distance intervals/ranges. In particular, the known distance can be a diameter of the first reflection object, wherein the first reflection object and the second reflection object are adjacent to one another in particular at least along one propagation direction of the transmission signal and the known distance is measured along the propagation direction of the transmission signal.

Preferably, the presence of the medium, for example fabric structures and/or known material layers, and/or a material composition of the medium can also be assumed or known, wherein further properties of the medium can be determined, for example a fluid content of a fabric or the alignment of material fibers or the density or indirectly the pressure or the fill level in a more or less filled medium. Specific application examples are e.g. the determination of the fill level in a vessel/container, the determination of the piston level in a cylinder and/or the determination of the penetration depth of a piston or a drill.

In the context of this invention, the primary propagation medium of the transmission signal is preferably air. When the radiation is incident on an object, a strong reflection occurs on the surface of the object, so that a large part of the energy of the radiation is reflected.

The radiation or waves reflected on the surface of the object, hereinafter referred to as the first reflection object, is/are received by means of a receiving antenna and correspond(s) to the first reception signal.

The remaining part of the radiation or waves of the transmission signal penetrates into or through the object and propagates further in or behind it (transmission). When the radiation or waves propagating in the object are incident on a second object with a different wave resistance or refractive index, a large part of the radiation is reflected on the surface of the second object, hereinafter referred to as the second reflection object.

The radiation or waves reflected on the second reflection object is/are received by means of a receiving antenna and correspond(s) to the second reception signal, the same receiving antenna preferably being used to receive the first reception signal and the second reception signal.

Both the first reception signal and the second reception signal are based on the same transmission signal and accordingly have the same characteristic time course. However, due to the different distance travelled by the transmission signal, the second reception signal is delayed in time compared to the first reception signal.

In a described, preferred embodiment, the transmitting and receiving antennas are approximately at the same position and are aligned approximately identically, so that the propagation direction of both the transmission signal and the radiation reflected by the first reflection object and/or from the second reflection object runs along a line substantially perpendicular to the surface of the reflection objects.

Due to this alignment of the transmitting and receiving antennas, the time delay corresponds to the time the transmission signal needs to travel twice the distance between the first reflection object and the second reflection object.

The reflection object associated with the first reception signal serves as a reference object to which the second reflection object is spatially related.

Consequently, the described method enables a determination of the spatial distance between the first reflection object (reference object) and the second reflection object without information about the characteristics of the transmission signal being known or without independent characteristics of the transmission signal being evaluated.

The method described is particularly suitable for applications in which the distance between the transmitting or receiving unit and the object to be examined is insignificant or unknown.

The method described is suitable, for example, for non-contact material analysis, such as the determination of layer thicknesses in multi-layer composite materials, as well as for the detection of contaminations and foreign bodies. Further applications can be found in medical technology (e.g. imaging localization of organs, analysis of organic substances), in security technology (e.g. people scanners), in automotive technology (e.g. distance radar), and in automation and production technology (e.g. material analysis, detection of production or packaging errors).

In a preferred embodiment of the method, the transmission signal is a modulated electromagnetic radiation and/or at least one modulated acoustic wave, in particular frequency-modulated electromagnetic radiation and/or frequency-modulated acoustic waves. Alternatively or additionally, the electromagnetic radiation and/or the at least one acoustic wave can be phase-modulated and/or amplitude-modulated.

The signal generator for generating the transmission signal is preferably a function generator that can generate periodic electrical and/or mechanical signals with different waveforms, in particular sine, rectangle, steps, triangle and sawtooth, with adjustable frequency, phase and amplitude.

A frequency-modulated signal comprises a frequency that changes over time, which increases linearly, for example, in order to abruptly drop to the initial value at a certain value (sawtooth pattern).

Due to the linear change in the frequency and continuous transmission, it is possible to determine the time difference between the first reception signal and the second reception signal. In the case of a sawtooth pattern, the maximum, clearly determinable time difference is the duration in which the frequency of the signal rises or falls linearly from the initial value to the final value. This corresponds to the periodic time of the transmission signal, also known as the "sweep time".

The evaluation of the first reception signal and the second reception signal, in particular the determination of the frequency difference between the first reception signal and the second reception signal, is carried out with the aid of a mixer stage.

The above statements apply analogously to a phase-modulated signal or an amplitude-modulated signal.

In contrast to conventional radar methods, the method described has the particular advantage of reduced receiver complexity and increased dynamic range. Furthermore, the described method is neither dependent on a distance between the origin of the transmission signal and the first reflection object nor dependent on a distance between the first reflection object and the sensor that receives the first reception signal and the second reception signal.

The receiver-side mixer stage preferably does not have a separate input for the transmission signal (so-called local oscillator). Instead, the first reception signal, which is the transmission signal reflected by the first reflection object (reference object), functions as a local oscillator of the mixer stage and thus serves as a reference signal. As a result, the mixer stage is operated with a combined signal of reference and reflection signal(s) on an input. Thus, the reception signal can advantageously be evaluated independently of the transmission signal. In other words, two reception signals are received and evaluated at the receiving-side mixer stage, each reception signal being a reflected signal. In contrast to conventional radar systems, the unchanged transmission signal from the transmitter is not received and evaluated. It is therefore not necessary to know the signal-typical properties of the transmission signal.

In contrast to the known radar methods, in the method according to a first aspect of the invention there is no common time or frequency base between transmitter and receiver. In other words: the receiver is decoupled from the transmitter. The determination of physical parameters of two or more reflection objects takes place/occurs without taking the transmission signal into account.

The first reception signal and the second reception signal are preferably received simultaneously. This can be achieved, for example, by generating a time-continuous transmission signal and/or a time-discrete transmission signal with a pulse duration, which leads to a time overlap of the first reception signal and the second reception signal at the receiver. Consequently, the method according to the invention differs from conventional methods in which, for example, a run-time measurement of time-separated pulses takes place/occurs between transmission and reception.

According to a preferred embodiment of the method, a physical parameter of the system is determined from a divergence of the modulation between the first reception signal and the second reception signal (intermodulation effect). Such a divergence can have a frequency difference, a phase difference and/or an amplitude difference, in particular depending on the selected form of modulation of the transmission signal. In contrast to this, in conventional methods, such a divergence between the transmission signal (reference signal) and one or more reception signals is detected and evaluated. In other words: In the present method according to a first aspect of the invention, a first reception signal corresponds to the reference signal, a dominant and/or strong reception signal preferably being used as the reference signal. By not including the transmission signal in the signal evaluation, the distance between the transmitter and the first reflection object (for example a boundary layer of an object) cannot be determined in the method according to the invention, which, however, is not required in numerous application scenarios or can even be advantageous, for example if there is a relative speed between the radar sensor and the objects to be reflected, which leads to a Doppler effect, which has to be factored out in digital signal processing. Therefore, the method according to the invention advantageously represents a reduction in receiver complexity.

Furthermore, the described method has an improved sensitivity, since all signals to be processed on the receiver side generally have a significantly lower power level than the transmission signal. Thus, the receiver can be designed and optimized for signals with low power.

The second reflection object is preferably at least partially surrounded by the first reflection object. The transmission signal preferably propagates at least partially through the first reflection object and exits it before it is reflected by the second reflection object.

The reflection objects to be detected can be positioned in such a way that the second reflection object is located completely or partially within an object. Here, in particular the surface of the object at least partially surrounding the second reflection object can represent the first reflection object.

In a preferred embodiment of the method, the transmission signal reflected by the second reflection object propagates at least partially through the first reflection object.

The reflection objects to be detected can be positioned in such a way that the transmission signal and/or the transmission signal reflected by the second reflection object propagate at least partially through the object comprising or representing the first reflection object. This is particularly the case if the reflection objects are located along a line in the primary propagation direction of the transmission signal.

The reflection objects to be detected can be positioned in such a way that the transmission signal propagates through the object representing or comprising the first reflection object, and exits it before being reflected by the second reflection object.

In this preferred embodiment, the transmission signal reflected by the second reflection object propagates through the object representing or comprising the first reflection object before it is received by the receiving antenna. This is particularly the case if the object representing or comprising the first reflection object and the object representing or comprising the second reflection object are located along a line in the primary propagation direction of the transmission signal and are spaced from one another.

An example of this preferred embodiment is a distance measurement for motor vehicles, in which the transmission signal propagates through the bumper of the vehicle, and wherein the surface of the bumper facing the transmission device acts as the first reflection object. The transmission signal exits the bumper and hits the second reflection object, which is, for example, a vehicle driving ahead or is comprised by it. The transmission signal reflected by the second reflection object propagates through the bumper, the surface of which functions as the first reflection object, exits it and is received by the receiving device.

In a preferred embodiment of the method, the at least one physical parameter of the system, in particular a spatial distance between the first reflection object and the second reflection object, is determined based on a divergence of the modulation of the first reception signal and the second reception signal. In other words, the properties of the modulation are used to determine the distance in the three-dimensional space of the first reflection object from the second reflection object. Here, it can be assumed, for example, that the first reflection object and/or the second reflection object are punctiform.

In a preferred embodiment of the method, the at least one physical parameter of the system, in particular the distance between the first reflection object and the second reflection object, is determined based on a frequency difference between the first reception signal and the second reception signal.

Alternatively or additionally, it is possible to determine the distance on the basis of a phase difference and/or an amplitude difference.

Preferably, the material properties or the composition of the medium between the first reflection object and the second reflection object are determined by determining the propagation speed or the attenuation of the electromagnetic and/or the or acoustic wave in the medium between the first reflection object and the second reflection object, with the distance between the first reflection object and the second reflection object being known (e.g. a known tube diameter or a distance between two plates).

In particular when a frequency-modulated transmission signal is used, the time difference and furthermore the additional distance can be determined on the basis of the time shift, in particular the delay of the frequency pattern of the second reception signal compared to the first reception signal. Alternatively or additionally, the distance can be determined on the basis of the time shift, in particular the delay of the phase pattern and/or amplitude pattern of the second reception signal compared to the first reception signal.

In a preferred embodiment of the method, the power level of the second reception signal is less than or greater than the power level of the first reception signal.

In particular, the first reception signal is determined as the reception signal that has the maximum power level from all the reception signals. Alternatively or additionally, the first reception signal is determined as the reception signal, the power level of which is in a predetermined power range. The power range can be selected based on the application of the method, with short measuring distances requiring lower power, e.g. an automobile radar. Furthermore, the lower limit of such a power range can be selected by selecting appropriately sensitive receiving mixers and depending on the frequency range used. It is also possible for the first reception signal and the second reception signal to be determined in such a way that the power levels of the two reception signals have a predetermined ratio to one another.

It can be advantageous if the reflective property, i.e. the influencing of phase and magnitude or amplitude and delay of incoming electromagnetic waves, of one or more media representing or comprising the reflection objects, is known. This makes it possible to carry out absolute measurements of the medium to be examined. For example, in a layer thickness measurement with a known propagation speed of the electromagnetic wave in the medium, the absolute thickness of the medium can be determined from the time delay of the first reception signal and the second reception signal.

In contrast, relative changes, for example a change in the position or property of a reflective object in relation to an initial reference or calibration measurement, can also be determined without further information. The same applies analogously to measurements of the material properties or composition of the medium between reflection objects.

Since the first reflection object, in particular its surface, serves as a spatial reference for position determination of the further reflection objects, the reliable detection of this first reflection object is immanent for an exact localization of the further reflection objects. As explained above, a large part of the energy of the transmission signal is usually reflected on the surface of the first reflection object, so that the power level of the associated first reception signal is greater than the power levels of the further reception signals, which are caused by reflection on the further reflection objects.

However, in certain cases the first reception signal associated with the first reflection object can only have a low power level, for example due to an unfavorable reflection behavior of the radiation of the transmission signal at the first reflection object, so that only a small part of the radiation energy of the transmission signal is thrown back by the first reflection object. As a result, a large part of the radiation penetrates into or through the object representing or comprising the first reflection object, and enters the medium located behind it. If this radiation hits a second reflection object there, which causes a strong reflection of the radiation, the associated second reception signal may have a higher power level than the first reception signal. This can lead to the second reflection object being recognized as the reference object instead of the first reflection object.

It can therefore be useful or even necessary to increase the reflection of the transmission signal on the first reflection object. For example, by additionally applying thin layers of a suitable material with a defined reflection coefficient to the object comprising or representing the first reflection object, a strong reflection of the transmission signal on the first reflection object and thus a high power level of the associated first reception signal can be generated, so that the first reflection object is reliably identified as a reference object. The material can be applied, for example, by foiling and/or painting and/or evaporation, e.g. vapor deposition.

Furthermore, the properties of the additionally applied layers can be specifically adapted to the transmission signal used and/or to the surface or the material properties of the objects representing or comprising the reflection objects, in order to achieve an optimal result. However, a sufficient part of the radiation energy should get into or through the object representing or comprising the first reflection object in order to enable a second reception signal reflected by a second reflection object to be reliably detected.

It can also be advantageous if it is known that a reflection object has a concise reflection behavior, so that the associated reception signal can be identified from a variety of reception signals and the corresponding reflection object can be used as a reference object.

In a further preferred embodiment, the method further comprises the steps of:
 receiving a third reception signal, wherein the third reception signal is based on the transmission signal reflected by a third reflection object;
 determining at least one physical parameter of the system based on the first reception signal and the third reception signal; and/or
 determining at least one physical parameter of the system based on the second reception signal and the third reception signal.

In particular, the at least one physical parameter of the system as described above, if a propagation medium between the first reflection object and the third reflection object or between the second reflection object and the third reflection object is known, may be a distance between the first reflection object and the third reflection object or between the second reflection object and be the third reflection object.

If the distance between the first reflection object and the third reflection object or between the second reflection object and the third reflection object is known, the presence of a medium between the first reflection object and the third reflection object or between the second reflection object and the third reflection object and/or a physical parameter of the medium can be determined as the at least one physical parameter of the system. Here, the physical parameter of the medium can preferably include at least one dielectric and/or mechanical property of the medium, for example the propagation constant or the permittivity of the medium between the first reflection object and the third reflection object or between the second reflection object and the third reflection object.

In a further preferred embodiment, the method further comprises the steps of:
 receiving an n-th reception signal, the n-th reception signal being based on the transmission signal reflected by an n-th reflection object;
 determining at least one physical parameter of the system based on the first reception signal and the n-th reception signal; and/or
 determining at least one physical parameter based on the m-th reception signal and the n-th reception signal.

In particular, the at least one physical parameter of the system as described above, if a propagation medium between the first reflection object and the n-th reflection object or between the first reflection object and the m-th reflection object or between the n-th reflection object and the m-th reflection object is known, may be a distance between the first reflection object and the n-th reflection object or between the first reflection object and the m-th reflection object or between the n-th reflection object and the m-th reflection object.

If the distance between the first reflection object and the n-th reflection object or between the first reflection object and the m-th reflection object or between the n-th reflection object and the m-th reflection object is known, the presence of a medium between the first reflection object and the n-th reflection object or between the first reflection object and the m-th reflection object or between the n-th reflection object and the m-th reflection object and/or a physical parameter of the medium can be determined as the at least one physical parameter of the system. Here, the physical parameter of the medium can preferably include at least one dielectric and/or mechanical property of the medium, for example the propagation constant or the permittivity of the medium between the first reflection object and the n-th reflection object or between the first reflection object and the m-th reflection object or between the n-th reflection object and the m-th reflection object.

Here, n and m are natural numbers and m is smaller than n. Preferably n>1 and m>1, more preferably n>10 and m>10. Preferably, n<100 and m<100, more preferably n<50 and m<50. In particular, due to the scattering of the transmission signal at each reflection object, there is a power drop in the transmission signal, which gives an upper limit to a total number of consecutive reflections based on the original power of the transmission signal.

The method described can be used for the detection and distance determination of a large number of reflection objects. Here, the distance from an arbitrary reflection object to any other reflection object can be determined, or, if the distances between two or more reflection objects are known, the material characteristics or composition of the media between the reflection objects.

In a preferred embodiment, the method further comprises the step of:
 visualizing the spatial arrangement of the first reflection object and the second reflection object based on the first reception signal and the second reception signal.

To evaluate the determined values, an optical representation based on the reception signals can preferably take place. Various possibilities are conceivable, depending on the field of application and the objective.

For example, to determine the layer thickness of a multi-layer composite, displaying the spatial distance between the individual reflection objects, which correspond to the boundary surfaces of the individual layers, using a graph is sufficient to obtain a representation suitable for reliable quality control.

In a preferred embodiment of the method, the visualization comprises a 2D and/or 3D reconstruction based on a variety of individual measurements.

For some applications, a 2D reconstruction or a 3D reconstruction of the measurement data is required, for example for the detection of cavities in cast parts. For this purpose, a variety of individual measurements or determinations of the at least one physical parameter are carried out along a line (2D) or over an area (3D).

For example, in order to obtain a sectional image perpendicular to the surface of an object, a variety of individual measurements are carried out along a line on the surface of the object to be examined. For the subsequent reconstruction of the individual measurement data, they can optionally be filtered and/or amplified as a function of depth and displayed as a volume section. The distance between the positions of the individual measurements determines the resolution of the reconstruction.

The method according to the invention does not have a common time or frequency base between transmitter and receiver, so that no mixing and/or comparison of the transmission signal with one or more reception signals can take place, as is the case, for example, with the FMCW method. In addition, the method according to the invention does not include any time measurement of signal pulses between the transmission signal and the reception signal(s), as is done in conventional methods. The at least one physical parameter is advantageously determined by mixing a plurality of reception signals without using the transmission signal and/or information relating to the transmission signal.

A second aspect for solving the object relates to a device for determining at least one physical parameter of a system with at least two reflection objects, comprising:
  a receiving device with a receiving antenna, designed:
    to receive a first reception signal, wherein the first reception signal is based on a signal, comprising at least one modulated wave, reflected by a first reflection object;
    to receive a second reception signal, wherein the second reception signal is based on a signal, comprising at least one modulated wave, reflected by a second reflection object; and
    to determine the at least one physical parameter of the system, in particular the distance between the first reflection object and the second reflection object, based on the first reception signal and the second reception signal.

The receiving device is preferably designed to determine the at least one physical parameter of the system without including or using the transmission signal. In other words: The at least one physical parameter is preferably determined by mixing two or more reception signals without using the transmission signal.

In particular, each reflected signal can comprise at least one modulated electromagnetic wave and/or at least one modulated acoustic wave.

A device suitable for carrying out the method according to the first aspect of the invention comprises at least one receiving device having a receiving antenna for receiving the reception signals. On the basis of the reception signals from a first reflection object (reference object) and at least one second reflection object, the device is configured to determine their spatial distance from one another. The at least one time-delayed reception signal is compared with the first reception signal, which serves as a reference signal.

The time delay of the respective reception signals corresponds to the duration that a transmission signal needs to travel twice the distance between the reference object and the respective reflection object.

If the distance between the first reflection object and the second reflection object is known, physical parameters of a medium, for example its material properties, can be determined between the first reflection object and the second reflection object. Preferably, the reception area of the receiving device, i.e. the solid angle from which the signals are received, is adapted to the respective application. For example, with the aid of a more highly directed receiving device, i.e. with a small reception angle, signals from a preferred direction are selected, and signals from non-preferred directions are suppressed.

Also, one or more receiving devices can be designed to specifically detect reflection signals whose directions of propagation are not substantially parallel to that of the transmission signal. In this way, for example, objects with a round surface or a surface that is not orthogonal to the propagation direction of the transmission signal can be identified or characterized more precisely. Several receiving devices can be designed according to all known methods of electronic beam steering, e.g. 'phased arrays', to determine the incidence angle of the reflection objects and thus their positions. In addition, additional devices can optionally be provided, which direct reflection signals that cannot be received directly by a receiving device due to their propagation direction, in the direction of the receiving device(s) in a targeted manner. These devices preferably have a high reflection coefficient and/or little influence on the reflection signals.

In a preferred embodiment, the receiving device comprises a mixer stage configured to determine the frequency difference between the first reception signal and the second reception signal, at least one physical parameter of the system being able to be determined based on the determined frequency difference.

The evaluation of the first reception signal and the second reception signal, in particular the determination of the frequency difference between the first reception signal and the second reception signal, can in particular be carried out with the aid of a mixer stage.

Here, the receiver-side mixer stage does not have a separate input for the transmission signal (so-called local oscillator), but instead uses the first reception signal, which is the transmission signal reflected by the first reflection object (reference object), as a local oscillator or reference signal.

If the reception signals have a frequency modulation, for example a step, triangle or sawtooth pattern, it is possible to determine the time difference between the first reception signal and the second reception signal from the frequency difference between the reception signal and the reference signal.

A third aspect for solving the object relates to a system for determining at least one physical parameter of a system with at least two reflection objects, comprising:

a transmitting device with a transmitting antenna, designed to transmit a transmission signal comprising at least one modulated wave;

a receiving device with a receiving antenna, designed:
to receive a first reception signal, wherein the first reception signal is based on the transmission signal reflected by a first reflection object;
to receive a second reception signal, wherein the second reception signal is based on the transmission signal reflected by a second reflection object; and
to determine the at least one physical parameter of the system, in particular the distance between the first reflection object and the second reflection object, based on the first reception signal and the second reception signal.

Preferably, the receiving device of the system is designed to determine the at least one physical parameter of the system without taking the transmission signal into account. In other words: The at least one physical parameter is preferably determined by mixing two or more reception signals without using the transmission signal and/or information relating to the transmission signal.

In particular, the transmission signal can comprise at least one modulated electromagnetic wave and/or at least one modulated acoustic wave. The use of at least one modulated electromagnetic wave and at least one modulated acoustic wave can in particular increase the scope of the method.

Preferably, if the distance between the first reflection object and the second reflection object is known, physical parameters of a medium, for example material properties, can be determined between the first reflection object and the second reflection object.

The transmitting antenna of the transmitting device and the receiving antenna of the receiving device are located in approximately the same position in the system and are aligned approximately identically, so that the propagation direction of both the transmission signal transmitted by the transmission device and the radiation reflected by the first reflection object and/or second reflection object runs along a line substantially perpendicular to the surface of the objects representing or comprising the reflection objects. The angle between the primary propagation direction of the transmission signal and the radiation reflected by the reflection objects and received by the receiving device is thus approximately 0°.

Due to the alignment of the transmitting and receiving antennas, the time delay corresponds to the duration the transmission signal needs to travel twice the distance between the first reflection object (reference object) and the second reflection object.

The evaluation of the first reception signal and the second reception signal, in particular the determination of the frequency difference between the first reception signal and the second reception signal, can be carried out with the aid of a mixer stage, the mixer stage not having an input for the transmission signal, but instead using the first reception signal as a reference signal.

The system is preferably a mobile system, in particular a portable system. As a result, the system can be set up and used in a simple manner at the location of the object to be examined, without the need to take samples. In particular, the system can be connectable to an energy source and/or comprise an internal energy source, for example a secondary battery.

In addition, in the method according to this disclosure, the device according to this disclosure and the system according to this disclosure, it is advantageously irrelevant whether the transmitting device and/or receiving device moves relative to the reflection object or their spatial distance changes, since the distance between the transmitting device and/or receiving device and the reflection object is not used to determine the at least one physical parameter.

The present disclosure will be explained in the following with reference to exemplary embodiments illustrated in figures.

DETAILED DESCRIPTION OF THE DRAWINGS

Figure 1A:
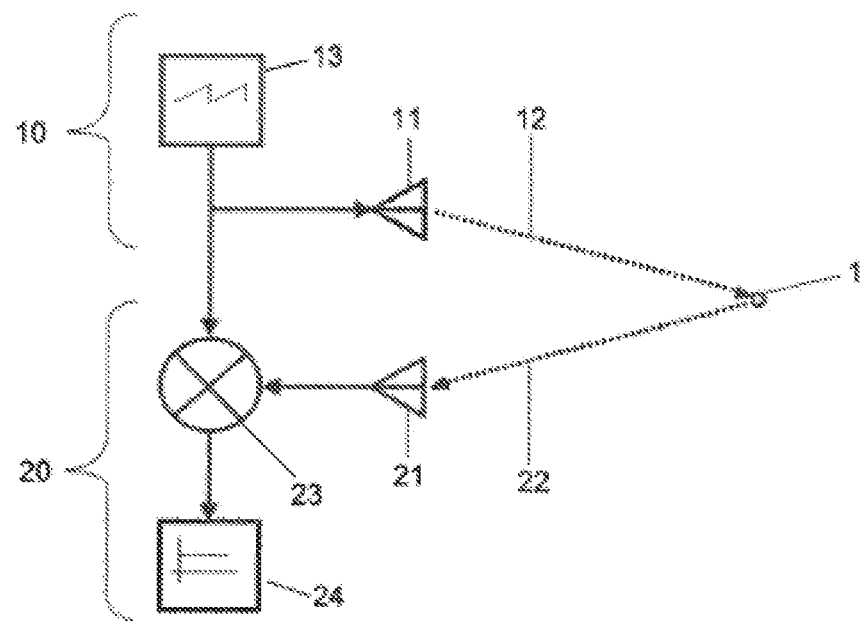
FIG. 1a shows a conventional system for the detection of reflection objects.

FIG. 1a shows a conventional system for the detection of reflection objects, the transmission signal 12 being used as a local oscillator in the mixer stage 23. The transmission device 10 comprises a signal generator or function generator 13 and a transmission antenna 11. The transmission signal 12 is directed to a reflection object 1 to be detected and is reflected by it. The reflection object 1 is, for example, a foreign body in an otherwise homogeneous object. The receiving device 20 of the system comprises a receiving antenna 21 receiving the transmission signal 12 reflected by the reflection object 1, which corresponds to the reception signal 22. Both the transmission signal 12 and the reception signal 22 are fed to the mixer stage 23, which is also comprised by the receiving device 20. The mixer stage 23 analyzes and compares the transmission signal 12 and the reception signal 22 and forwards the measurement results, in the present case the distance between transmission antenna 11 or reception antenna 21 and reflection object 1, to an output device 24, for example.

In the present example, the reflection object 1 is an iron rod in a cast concrete block, which extends into the image plane. The system shown in FIG. 1a is capable of detecting the iron rod and of determining its position in relation to the transmitting antenna 11 and receiving antenna 21. To this end, the reception signal 22 received by the receiving antenna 21 is compared with the transmission signal 12 transmitted by the transmitting device 10 by the mixer stage 23. Due to the distance travelled by the transmission signal 12 from the transmission antenna 11 to the reflection object 1 and from the reflection object 1 to the reception antenna 21, the reception signal 22 has a time delay compared to the transmission signal 12 fed directly from the signal generator 13 to the mixer stage 23. The time delay corresponds to the duration the radiation emitted by the transmitting antenna 11 needs to travel the distance from the transmitting antenna 11 to the reflection object 1 and from the reflection object 1 to the receiving antenna 21.

Since the transmitting antenna 11 and the receiving antenna 21 are positioned directly next to one another in the system shown in FIG. 1a, i.e. are located at approximately the same position, the spatial distance between the transmitting antenna 11 and the reflection object 1 is identical to the spatial distance between the reflection object 1 and the receiving antenna 21. Consequently, the time delay of the reception signal 22 corresponds to the duration the emitted radiation needs for twice the distance between the transmitting antenna 11 and the reflection object 1 or the reflection object 1 and the receiving antenna 21. As a result, an exact position of the reflection object 1 in relation to the detection system can be determined.

In many applications, however, the distance between the reflection object 1 and the detection system is of less interest than the exact position of the reflection object 1 within an object, in particular in relation to its surface or other elements introduced into the object. In the conventional method shown in FIG. 1*a*, the distance between the surface and the detection system must also be measured, and the results obtained in each case must be computed further. The technical effort involved is very high though.

In the present example, the exact position of the iron rod in the concrete block is less important. Rather, it must be ensured that e.g. the reflection object, i.e. here the iron rod, is detected and/or that the iron rod has a sufficient distance from the surface of the concrete block, i.e. that the iron rod is covered by sufficient material and is securely anchored in the concrete block.

For such applications in particular, the method of the present disclosure offers a technique with significantly reduced receiver complexity and increased sensitivity.

Figure 1B:
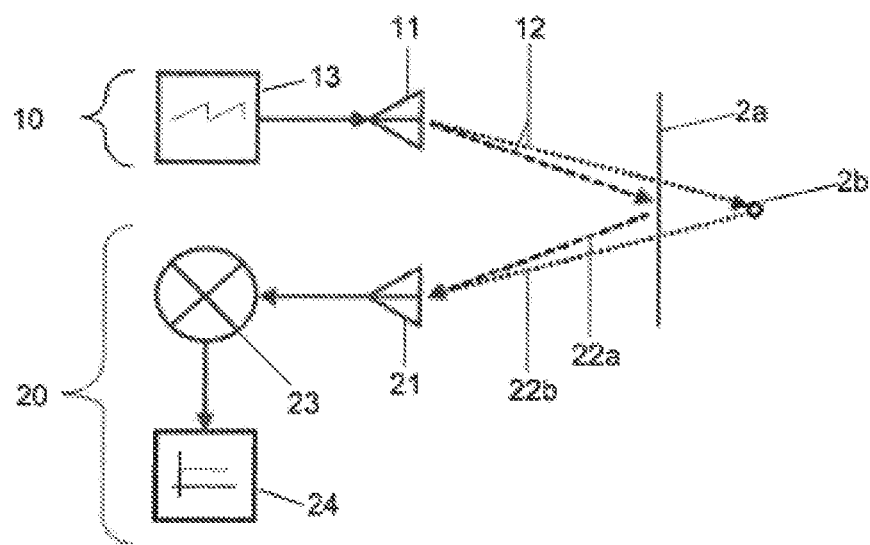
FIG. 1b shows a system according to the present disclosure.

FIG. 1*b* shows an exemplary embodiment of the system of the present disclosure, the mixer stage 23 not having a separate input for the transmission signal 12. The transmission device 10 comprises a signal generator or function generator 13 and a transmission antenna 11. The transmission signal 12 is directed to the reflection objects 2*a* and 2*b* to be detected and is reflected by them. In this example, the reflection object 2*b* is a foreign body in an otherwise homogeneous object, the reflection object 2*a* being its surface.

One possible application of the present exemplary embodiment is the analysis of components made from glass fiber reinforced plastics (GRP).

Various defects in the structure of the components, such as impurities, delamination, folds, air inclusions, resin pockets, dry laminate areas or undulation of the fibers can be completely and reliably detected both during the production process and on the finished component.

In this application, the surface of the component represents the first reflection object 2*a*, and thus the reference object. In the case of an ideal component with a homogeneous internal structure, a second reflection would only take place on the rear side of the component. In this case, the reflection object 2*b* corresponds to the rear side of the analyzed component. In the case of the defects described above, however, further reflections take place in the component itself at the boundary layers of the individual defects, the various defects corresponding to the reflection objects 2*b*. With the aid of the signal evaluation, the distance between the component surface (reflection object 2*a*/reference object) and the defects (reflection objects 2*b*) can be determined. Furthermore, the spatial extent of the defects can be determined with a large number of measurements.

The receiving device 20 of the system comprises a receiver antenna 21 that receives the transmission signal 12 reflected by the reflection objects 2*a* and 2*b*, which corresponds to the reception signals 22*a* and 22*b*, and feeds them to the mixer stage 23 also comprised by the receiving device 20. The mixer stage 23 analyzes the reception signals 22*a* and 22*b* and forwards the measurement results, in the present case the distance between reflection object 2*a* and reflection object 2*b*, to an output device 24, for example.

A preferred embodiment of the mixer stage 23 uses the effect of the natural mixing of a physical component, which always occurs when the component has a non-linear transfer characteristic in the relevant frequency range (e.g. diode, transistor, photodiode, microphone, etc.).

The reception signals 22*a* and 22*b* received by the receiving antenna 21 are analyzed by the mixer stage 23. Here, the reception signal 22*b* has a time delay compared to the reception signal 22*a*, because the radiation emitted by the transmitting antenna 11 also has to travel the distance from the reflection object 2*a* to the reflection object 2*b* and from the reflection object 2*b* to the reflection object 2*a*, i.e. twice the distance between reflection object 2*a* and the reflection object 2*b*.

The time delay of the reception signals 22*a* and 22*b* in relation to the transmission signal 12 is not measured, since the mixer stage 23 does not receive any information about the transmission signal 12. A reduced receiver complexity can thereby be achieved.

Figure 2:
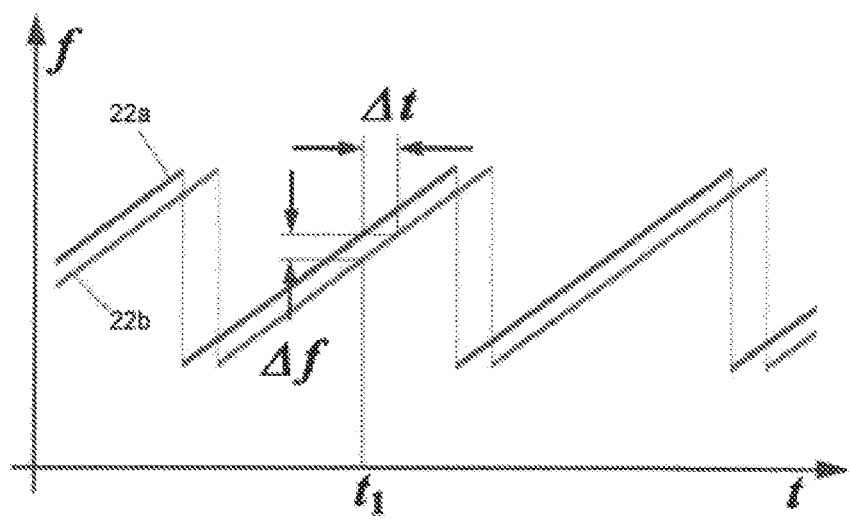
FIG. 2 shows reception signals of the exemplary embodiment in FIG. 1b.

FIG. 2 shows the reception signals fed to the mixer stage of the exemplary embodiment in FIG. 1*b*. The illustration shows the reception signal 22*a*, which comprises the transmission signal 12 reflected by the reflection object 2*a*, and the reception signal 22*b*, which comprises the transmission signal 12 reflected by the reflection object 2*b* and is time-delayed in comparison to the reception signal 22*a*.

In the present example, the transmission signal 12 is a frequency-modulated signal with a sawtooth shape, which is particularly suitable for the method of the present disclosure. Due to the time delay $\Delta t$ of the reception signal 22*b*, the frequency difference $\Delta f$ of the two reception signals 22*a* and 22*b* can be determined for a specific point in time t1. By determining the steepness of the frequency rise, i.e. the change in frequency per time, conclusions can be drawn about the time delay $\Delta t$ and consequently about the distance between reflection objects 2*a* and 2*b*.

As can be seen in FIG. 2, the distance between the reflection objects can only be clearly determined if the time delay of the second reception signal 22*b* due to the additional distance travelled is less than the period of the transmission signal, the so-called "sweep time". Further, the measurement time t1 must be selected such that it is after the steep, falling edge of the time-delayed reception signal 22*b* and before the steep, falling edge of the reception signal 22*a*, since otherwise no correct result based on the frequency difference between the two reception signals can be calculated. The same holds true when a frequency-modulated transmission signal is used in the conventional method according to FIG. 1*a*.

In the case of frequency-modulated transmission signals, the resolution (accuracy) is determined by the selection of the frequency deviation per time and the maximum possible measuring range is determined by the duration of the frequency rise (period duration). A large frequency deviation requires more complex and expensive transmission and reception electronics, so that it is usually kept moderate. In contrast, the best possible resolution of the detection system is usually desirable. As a result, the measuring range of the detection system must be restricted in order to obtain a system as precise as possible with moderate technical effort.

The measuring range of the method according to the present disclosure is very small in comparison. It corresponds to the distance between the first reflection object (reference object) and the reflection object furthest away from it. With conventional methods, such as shown in FIG. 1*a*, a much larger measuring range is required, since it must additionally extend to the distance between the transmitting antenna 11 and the closest reflection object (reference object), which usually corresponds to a multiplication of the measuring range.

Consequently, the method according to the present disclosure also enables a greatly improved accuracy with the same technical complexity.

LIST OF REFERENCE NUMERALS 1 reflection object
2a first reflection object
2b second reflection object
10 transmitting device
11 transmitting antenna
12 transmission signal
13 signal generator
20 receiving device
21 receiving antenna
22 Reception signal
22a first reception signal
22b second reception signal
23 mixer stage
24 output device

The invention claimed is:

1. A method for determining at least one physical parameter of a system with at least two reflection objects, comprising:
generating a transmission signal comprising at least one modulated wave;
receiving a first reception signal, wherein the first reception signal is based on the transmission signal reflected by a first reflection object;
receiving a second reception signal, wherein the second reception signal is based on the transmission signal reflected by a second reflection object; and
determining the at least one physical parameter of the system based on the first reception signal and the second reception signal, wherein determining the at least one physical parameter of the system occurs without including the transmission signal.

2. The method of claim 1, wherein the at least one modulated wave comprises a modulated electromagnetic wave and/or a modulated acoustic wave.

3. The method according to claim 1, wherein the transmission signal comprises a frequency-modulated wave, a phase-modulated wave, an amplitude-modulated wave and/or a pulse-modulated wave.

4. The method according to claim 1, wherein the at least one physical parameter is a distance between the first reflection object and the second reflection object.

5. The method according to claim 1, wherein if a distance between the first reflection object and the second reflection object is known, the presence of a medium between the first reflection object and the second reflection object is determined as the at least one physical parameter of the system.

6. The method according to claim 5, wherein at least one physical parameter of the medium, in particular dielectric properties of the medium, is determined as the at least one physical parameter of the system.

7. The method according to claim 1, wherein the second reflection object is at least partially surrounded by the first reflection object; and/or
wherein the transmission signal propagates at least partially through the first reflection object and exits it before being reflected by the second reflection object.

8. The method according to claim 1, wherein the transmission signal reflected by the second reflection object propagates at least partially through the first reflection object.

9. The method according to claim 1, wherein a spatial distance between the first reflection object and the second reflection object is determined based on a divergence of the modulation of the first reception signal and the second reception signal.

10. The method according to claim 1, wherein the at least one physical parameter of the system, in particular a distance between the first reflection object and the second reflection object, is determined based on a frequency difference between the first reception signal and the second reception signal.

11. A device for determining at least one physical parameter of a system with at least two reflection objects, comprising:
a receiving device with a receiving antenna, configured to:
receive a first reception signal, wherein the first reception signal is based on a signal, comprising at least one modulated wave, reflected by a first reflection object;
receive a second reception signal, wherein the second reception signal is based on a signal, comprising at least one modulated wave, reflected by a second reflection object; and
determine the at least one physical parameter of the system based on the first reception signal and the second reception signal, wherein determining the at least one physical parameter of the system occurs without including a transmission signal.

12. The device according to claim 11, wherein the at least one modulated wave comprises a modulated electromagnetic wave and/or a modulated acoustic wave.

13. The device according to claim 11, wherein the receiving device comprises a mixer stage configured to determine a frequency difference between the first reception signal and the second reception signal,
wherein the at least one physical parameter of the system is determinable based on the determined frequency difference.

14. A system for determining at least one physical parameter of a system with at least two reflection objects, comprising:
a transmitting device with a transmitting antenna, configured to transmit a transmission signal comprising at least one modulated wave; and
a receiving device with a receiving antenna, configured to:
receive a first reception signal, wherein the first reception signal is based on the transmission signal reflected by a first reflection object;
receive a second reception signal, wherein the second reception signal is based on the transmission signal reflected by a second reflection object; and
determine the at least one physical parameter of the system based on the first reception signal and the second reception signal, wherein determining the at least one physical parameter of the system occurs without including the transmission signal.

15. The system according to claim 14, wherein the at least one modulated wave comprises a modulated electromagnetic wave and/or a modulated acoustic wave.

16. The system according to claim 14, wherein the system is a mobile system, in particular a portable system.

* * * * *